United States Patent
Watanabe et al.

(10) Patent No.: US 9,355,005 B2
(45) Date of Patent: May 31, 2016

(54) DETECTION APPARATUS AND DETECTION METHOD

(71) Applicant: FUJITSU LIMITED, Kawasaki-shi, Kanagawa (JP)

(72) Inventors: Yukihiro Watanabe, Kawasaki (JP); Yasuhide Matsumoto, Kawasaki (JP); Fumi Iikura, Shinagawa (JP); Masataka Sonoda, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 265 days.

(21) Appl. No.: 14/274,329

(22) Filed: May 9, 2014

(65) Prior Publication Data
US 2014/0250334 A1 Sep. 4, 2014

Related U.S. Application Data

(63) Continuation of application No. PCT/JP2011/079099, filed on Dec. 15, 2011.

(51) Int. Cl.
*G06F 11/00* (2006.01)
*G06F 11/34* (2006.01)
(Continued)

(52) U.S. Cl.
CPC .......... *G06F 11/3409* (2013.01); *G06F 11/076* (2013.01); *G06F 11/079* (2013.01); *G06F 11/0709* (2013.01); *G06F 11/0781* (2013.01); *G06F 11/3072* (2013.01)

(58) Field of Classification Search
CPC .............. G06F 11/079; G06F 2201/86; G06F 11/0781; G06F 11/3072; G06F 11/3466
See application file for complete search history.

(56) References Cited

U.S. PATENT DOCUMENTS

2005/0172162 A1* 8/2005 Takahashi ........... G06F 11/0709 714/4.4
2009/0172034 A1 7/2009 Aoyama et al.
(Continued)

FOREIGN PATENT DOCUMENTS

JP 09-219720 8/1997
JP 2008-197962 8/2008
(Continued)

OTHER PUBLICATIONS

International Search Report, mailed in connection with PCT/JP2011/079099 and mailed Jan. 31, 2012.
(Continued)

*Primary Examiner* — Charles Ehne
(74) *Attorney, Agent, or Firm* — Fujitsu Patent Center

(57) ABSTRACT

A detection apparatus includes first and second calculating units and a storing unit. The first calculating unit calculates, when a configuration of a system is changed or the like and a combination of messages occurs, a ratio of the number of occurrences of an event at time points corresponding to a time of occurrence of the combination to the number of occurrences of the combination. The second calculating unit calculates an indicator to determine whether the combination of the messages is used to detect occurrence of the event or to detect a sign of occurrence of the event, based on the ratio and on the number of occurrences of the event. When the indicator indicates that a condition is satisfied, the storing unit stores the combination of the messages as a combination used to detect occurrence of the event or to detect the sign of occurrence of the event.

7 Claims, 8 Drawing Sheets

(51) Int. Cl.
*G06F 11/07* (2006.01)
*G06F 11/30* (2006.01)

(56) References Cited

U.S. PATENT DOCUMENTS

2009/0300428 A1* 12/2009 Matsumoto ......... G06F 11/0709
714/47.1
2009/0313198 A1* 12/2009 Kudo .................. G06F 11/0709
706/47

FOREIGN PATENT DOCUMENTS

JP 2009-157830 7/2009
JP 2011-170802 9/2011

OTHER PUBLICATIONS

Y. Watanabe et al., "Trouble Detection with Message Pattern Learning", Internet and Operation Technology Symposium 2009 Ronbunshu, pp. 23-30 (English Abstract).

* cited by examiner

FIG.3

| EVENT TYPE | OCCURRENCE DATE/ TIME |
|---|---|
| HDD FAILURE | 2011/06/12 10:15:00 |
| APPLICATION PERFORMANCE DEGRADATION | 2011/06/12 10:16:05 |
| ⋮ | ⋮ |

| MESSAGE | MESSAGE TYPE |
|---|---|
| ubuzou kernel ⋯ | 1 |
| com.fff ⋯ | 2 |
| ⋮ | ⋮ |

| MANAGEMENT META-INFORMATION | VALUE | | | | |
|---|---|---|---|---|---|
| ID | 02e631d1-94c4-4391-a9c2-07d5fc3f75f9 | | | | |
| CONFIGURATION CHANGE DATE/TIME | 2011/06/12 10:15:00 | | | | |
| MESSAGE PATTERN | EVENT TYPE | NUMBER OF OCCURRENCES OF PATTERN | NUMBER OF OCCURRENCES OF EVENT AFTER OCCURRENCE OF PATTERN | EVENT PROBABILITY | MATURITY |
| [1,3,4,7,16] | HDD FAILURE | 2 | 2 | 1.00 | 2.0 |
| [1,4,9,11,17] | APPLICATION PERFORMANCE DEGRADATION | 4 | 3 | 0.75 | 2.25 |
| [2,12,18,20] | APPLICATION PERFORMANCE DEGRADATION | 3 | 2 | 0.67 | 1.33 |
| [2,12,11,16] | HDD FAILURE | 8 | 7 | 0.875 | 6.13 |

| MANAGEMENT META-INFORMATION | VALUE |
|---|---|
| NEW PATTERN REGISTRATION DESTINATION | 24fa6618-2118-440a-8591-bc9c5b99ec52 |
| MESSAGE PATTERN | REGISTRATION DESTINATION |
| [1,3,4,7,9] | 00000000-0000-0000-0000-000000000000 |
| [1,4,6,10,12] | 00000000-0000-0000-0000-000000000000 |
| [3,7,11,14] | 00000000-0000-0000-0000-000000000000 |
| [1,3,4,7,16] | 02e631d1-94c4-4391-a9c2-07d5fc3f75f9 |
| [1,4,9,11,17] | 02e631d1-94c4-4391-a9c2-07d5fc3f75f9 |
| [2,12,18,20] | 02e631d1-94c4-4391-a9c2-07d5fc3f75f9 |
| [2,12,11,16] | 02e631d1-94c4-4391-a9c2-07d5fc3f75f9 |
| [6,8,9,11] | 24fa6618-2118-440a-8591-bc9c5b99ec52 |
| [7,9,10,12,13] | 24fa6618-2118-440a-8591-bc9c5b99ec52 |
| : | : |

FIG.7

| MESSAGE PATTERN | EVENT TYPE | NUMBER OF OCCURRENCES OF PATTERN | NUMBER OF OCCURRENCES OF EVENT AFTER OCCURRENCE OF PATTERN | EVENT PROBABILITY |
|---|---|---|---|---|
| [1,3,4,7,9] | HDD FAILURE | 165 | 137 | 0.83 |
| [1,4,6,10,12] | APPLICATION PERFORMANCE DEGRADATION | 120 | 108 | 0.90 |
| [3,7,11,14] | HDD FAILURE | 25 | 22 | 0.88 |
| ⋮ | ⋮ | ⋮ | ⋮ | ⋮ |

14f

DETECTION APPARATUS AND DETECTION METHOD

CROSS-REFERENCE TO RELATED APPLICATION(S)

This application is a continuation of International Application No. PCT/JP2011/079099, filed on Dec. 15, 2011, the entire contents of which are incorporated herein by reference.

FIELD

The embodiments discussed herein are directed to a detection apparatus and a detection method.

BACKGROUND

There is a known detection apparatus that detects occurrence of an event or a sign of occurrence of the event based on a log of messages (message log) generated in various systems, such as an information technology (IT) system.

For example, the detection apparatus extracts messages from the message log. Then, the detection apparatus classifies the extracted messages according to message types. Subsequently, the detection apparatus refers to a first database (DB), in which a type of a failure in a system and a date and time of occurrence of the failure are registered in an associated manner, and calculates probability as described below based on a pattern of the types of one or more messages and based on a type of a failure corresponding to the date and time of occurrence of the pattern. Specifically, the detection apparatus calculates the probability of an event that occurs when a message in the pattern occurs, for each of the patterns of the types of messages. Subsequently, the detection apparatus registers the pattern of the types of the messages, the event, and the probability in a second DB in an associated manner. In this manner, the detection apparatus learns the probability of an event for each of the patterns of the types of the messages. Then, if one or more messages occur in the system, the detection apparatus refers to the second DB, and if the probability corresponding to a pattern of the types of the messages is equal to or greater than a threshold, detects occurrence of an event corresponding to the pattern. Then, the detection apparatus sends a result of the detection to a terminal used by a user, such as an administrator, who manages the system.

Incidentally, as a related technology, there is a known device that handles multiple errors as a single error when a number of errors (burst error) occur in the network.

Furthermore, as another related technology, there is a known computer system that modifies already-learned failure detection rules according to a policy, evaluates a false detection rate or a non-detection rate based on the modified failure detection rules, and employs a failure detection rule based on which a preferable evaluation result is obtained. With regard to the technologies as described above, refer to Japanese Laid-open Patent Publication No. H9-219720, Japanese Laid-open Patent Publication No. 2009-157830, and "Trouble Detection with Message Pattern Learning" Yukihiro Watanabe, Yasuhide Matsumoto, International Processing Society of Japan Journal, Dec. 10, 2009, for example.

However, in the detection apparatus as described above, it is difficult to detect occurrence of an event with high accuracy immediately after operation of the system is started or a configuration of the system is changed by addition of a server or by a change or addition of an application executed on the server.

For example, a new type of a message may occur immediately after the configuration of the system is changed. In this case, the detection apparatus learns the probability of an event or the like based on a pattern containing the new type of the message that has not been learned. However, because the number of learnings is small, the accuracy of a result of the learning is not always high. For example, if an event irrelevant to the message occurs at the same time as the occurrence of the new type of the message, the detection apparatus obtains a result of learning as described below. Specifically, the detection apparatus learns that the probability of the event that occurs with the pattern containing the new type of the message is 100%. Therefore, the accuracy of the result of the learning performed by the detection apparatus immediately after the change in the configuration of the system may be low. Consequently, the detection apparatus sometimes does not detect occurrence of an event with high accuracy immediately after the change in the configuration of the system.

Furthermore, even immediately after the start of the operation of the system, because the number of learnings is low, the accuracy of a result of learning performed by the detection apparatus may be low similarly to the above. Therefore, the detection apparatus sometimes does not detect occurrence of an event with high accuracy immediately after the start of the operation of the system.

SUMMARY

According to an aspect of an embodiment, a detection apparatus includes a first calculating unit, a second calculating unit, and a storing unit. The first calculating unit calculates, when operation of a system is started or when a configuration of the system is changed and when a combination of messages occurs in the system after the start of the operation of the system or the change in the configuration of the system, a ratio of number of occurrences of an event in the system at time points corresponding to a time of occurrence of the combination to number of occurrences of the combination. The second calculating unit calculates an indicator to determine whether the combination of the messages is used to detect occurrence of the event or to detect a sign of occurrence of the event, based on the ratio calculated by the first calculating unit and the number of occurrences of the event. The storing unit stores, when the indicator calculated by the second calculating unit indicates that a condition used to detect occurrence of the event or to detect the sign of occurrence of the event is satisfied, the combination of the messages in a storage unit as a combination of messages used to detect occurrence of the event or to detect the sign of occurrence of the event.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a data structure of a first database (DB);

FIG. 4 is a diagram illustrating an example of a data structure of a second DB;

FIG. 5 is a diagram illustrating an example of a data structure of a file registered in a third DB;

FIG. 6 is a diagram illustrating an example of a data structure of a fourth DB;

FIG. 7 is a diagram illustrating an example of a data structure of a fifth DB;

DESCRIPTION OF EMBODIMENTS

Preferred embodiments of the present invention will be explained with reference to accompanying drawings. The embodiments below are not intended to limit the disclosed technologies. Furthermore, the embodiments may be combined appropriately as long as the processing contents do not conflict with each other.

Figure 1:
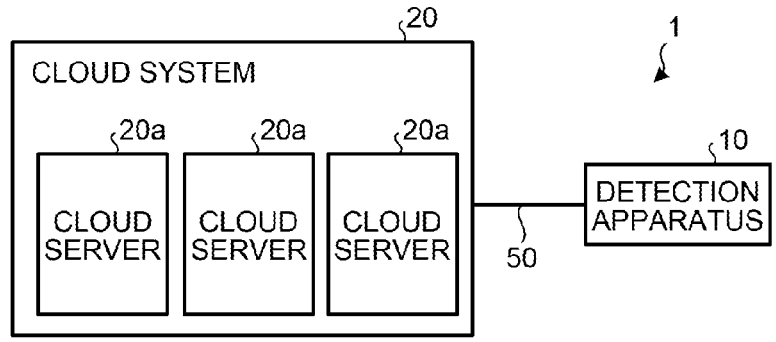
FIG. 1 is a diagram illustrating an example of a configuration of a system to which a detection apparatus according to an embodiment is applied.

A detection apparatus according to an embodiment will be described. FIG. 1 is a diagram illustrating an example of a configuration of a system to which the detection apparatus according to the embodiment is applied. In the example in FIG. 1, a system 1 includes a detection apparatus 10 and a cloud system 20. The detection apparatus 10 and the cloud system 20 are enabled to communicate with each other via a network 50. The detection apparatus 10 and the cloud system 20 are installed in, for example, an information and communication technology (ICT) system of a cloud service provider or the like.

The cloud system 20 illustrated in the example in FIG. 1 includes three cloud servers 20a. Incidentally, the number of the cloud servers 20a included in the cloud system 20 may be an arbitrary number. The cloud servers 20a generate at least one virtual machine (VM). The VM executes various applications in response to an instruction to execute the various applications issued from a user terminal (not illustrated) of a user using the cloud system 20, and transmits results of execution of the applications to the user terminal. In this manner, the cloud system 20 provides services to the user.

Furthermore, in the cloud system 20, the cloud servers 20a and the VM transmit various events, such as failures, that have occurred in the cloud servers 20a or the VM to the detection apparatus 10 together with the date and time of occurrence of each of the events. Moreover, in the cloud system 20, the cloud servers 20a and the VM store various messages generated by the cloud servers 20a and the VM in a storage device (not illustrated). Furthermore, in the cloud system 20, the cloud servers 20a and the VM transmit messages to the detection apparatus 10.

Moreover, in the cloud system 20, if an application executed by the VM is changed or if a configuration is changed by addition of the cloud server 20a for example, the cloud server 20a or the VM subjected to the change in the configuration transmits a message indicating the change in the configuration to the detection apparatus 10. Furthermore, in the cloud system 20, when operation of the cloud system 20 is started, any of the cloud servers 20a transmits a message indicating the start of the operation to the detection apparatus 10.

As will be described later, the detection apparatus 10 uses, as a combination of messages for detection, a combination of messages for which the maturity exceeds a threshold a among combinations (patterns) of messages. Therefore, the detection apparatus 10 does not use, as a message for detection, a message that is newly generated immediately after the start of the operation of the system or immediately after the change in the configuration of the system. Consequently, because the detection apparatus 10 does not use a message with which the accuracy of detection becomes uncertain even immediately after the start of the operation of the system or immediately after the change in the configuration of the system, it becomes possible to detect an event with high accuracy.

Incidentally, the number of the detection apparatuses 10 and the number of the cloud servers 20a included in the system 1 may be arbitrary numbers. Furthermore, the number of the VMs generated by the cloud servers 20a may be an arbitrary number.

Functional Configuration of Detection Apparatus

Figure 2:
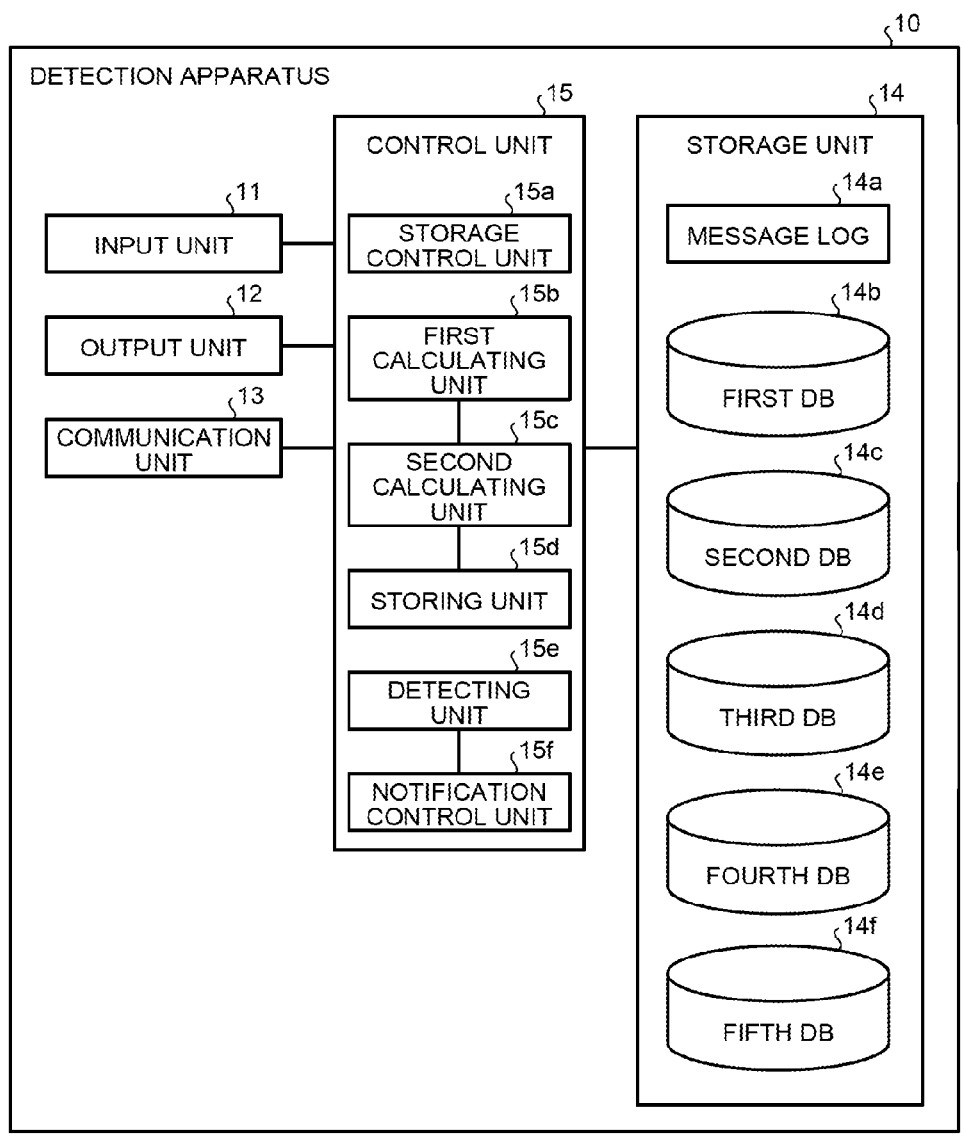
FIG. 2 is a diagram illustrating an example of a functional configuration of the detection apparatus according to the embodiment.

FIG. 2 is a diagram illustrating an example of a functional configuration of the detection apparatus according to the embodiment. As illustrated in FIG. 2, the detection apparatus 10 includes an input unit 11, an output unit 12, a communication unit 13, a storage unit 14, and a control unit 15.

The input unit 11 inputs various types of information to the control unit 15. For example, the input unit 11 receives various instructions from a user and inputs the received instructions to the control unit 15. Examples of a device of the input unit 11 include a device such as a mouse or a keyboard that receives operation from the user.

The output unit 12 outputs various types of information. For example, the output unit 12 displays a detection result by the control on display by a notification control unit 15f to be described later. Examples of a device of the output unit 12 include a liquid crystal display.

The communication unit 13 is an interface that enables communication between various devices. For example, the communication unit 13 is connected to the cloud system 20. Therefore, the detection apparatus 10 and the cloud system 20 are enabled to communicate with each other. For example, when receiving a type of an event and a date and time of occurrence of the event from the cloud system 20, the communication unit 13 transmits the received type of the event and the received date and time of occurrence of the event to the control unit 15. Furthermore, when receiving a message from the cloud system 20, the communication unit 13 transmits the received message to the control unit 15. Moreover, when receiving a message indicating a change in the configuration from the cloud system 20, the communication unit 13 transmits the received message to the control unit 15. Furthermore, when receiving a message indicating a start of operation from the cloud system 20, the communication unit 13 transmits the received message to the control unit 15.

The storage unit 14 stores therein various types of information. For example, the storage unit 14 stores therein a message log 14a, a first DB 14b, a second DB 14c, a third DB 14d, a fourth DB 14e, and a fifth DB 14f.

The message log 14a is a log of various messages indicating the states of the cloud servers 20a and the VM of the cloud system 20 or execution states of applications. The message log 14a is stored in the storage unit 14 by a storage control unit 15a to be described later.

In the first DB 14b, a type of an event that has occurred in the cloud system 20 and a date and time of occurrence of the event are registered in an associated manner. FIG. 3 is a diagram illustrating an example of a data structure of the first DB. In the example in FIG. 3, the first DB 14b contains items of "event type" and "occurrence date/time". In the example in FIG. 3, the type of the event that has occurred in the cloud system 20 is registered in the item of "event type". Furthermore, in the example in FIG. 3, the date and time of occurrence of the event is registered in the item of "occurrence date/time". In each of the items in the first DB 14b, a corresponding content is registered by the storage control unit 15a to be described later. A first record of the first DB 14b illustrated in the example in FIG. 3 indicates that an event of a hard disk drive (HDD) failure that is a failure in an HDD occurred at 10:15:00 on Jun. 12, 2011. Furthermore, a second record of the first DB 14b illustrated in the example in FIG. 3 indicates that an event of an application performance degradation that is degradation in the performance of an application occurred at 10:16:05 on Jun. 12, 2011.

In the second DB 14c, a message and a type of the message are registered in an associated manner. FIG. 4 is a diagram illustrating an example of a data structure of the second DB. In the example in FIG. 4, the second DB 14c contains items of "message" and "message type". In the example in FIG. 4, the content of a message is registered in the item of "message". Furthermore, in the example in FIG. 4, an identifier indicating the type of the message is registered in the item of "message type". The second DB 14c is used by a first calculating unit 15b, which will be described later, to classify the types of messages in the message log 14a. A first record of the second DB 14c illustrated in the example in FIG. 4 indicates that the type of a message containing "ubuzou kernel . . . " corresponds to a type indicated by an identifier of "1". A second record of the second DB 14c illustrated in the example in FIG. 4 indicates that the type of a message containing "com.fff . . . " corresponds to a type indicated by an identifier of "2".

In the third DB 14d, files are registered, in each of which a combination of messages is registered before the combination is registered in the fifth DB 14f that is used to detect occurrence of an event or to detect a sign of occurrence of the event as will be described later. In the third DB 14d, a first file is registered when the operation of the cloud system 20 is started, and a new file is registered every time the configuration of the cloud system 20 is changed. FIG. 5 is a diagram illustrating an example of a data structure of each of the files registered in the third DB. In the example in FIG. 5, each of files 14_d1, 14_d2, 14_d3, . . . , and so on registered in the third DB 14d contains items of "ID" and "configuration change date/time".

In the example in FIG. 5, an identifier for identifying a file is registered in the item of "ID". Furthermore, in the example in FIG. 5, a date and time of a start of the operation of the cloud system 20 is registered in the item of "configuration change date/time" in the first file 14_d1, and a date and time of the change in the configuration is registered in the same item in the second or later file 14_d2, 14_d3, . . . , or the like. In the example in FIG. 5, an identifier of "02e631d1-94c4-4391-a9c2-07d5fc3f75f9" of the file 14_d1 is registered in the item of "ID" of the file 14_d1. Furthermore, in the example in FIG. 5, "2011/06/12 10:15:00" indicating the date and time of the change in the configuration of the cloud system 20 or the date and time of the start of the operation of the cloud system 20 is registered in the item of "configuration change date/time" of the file 14_d1. In each of the items of "ID" and "configuration change date/time" in each of the files, a corresponding content is registered by the storage control unit 15a to be described later.

Furthermore, in the example in FIG. 5, each of the files 14_d1 and so on registered in the third DB 14d contains items of "message pattern", "event type", "number of occurrences of pattern", "number of occurrences of event after occurrence of pattern", "event probability", and "maturity".

In the example in FIG. 5, a combination of identifiers of one or more messages is registered in the item of "message pattern". Furthermore, in the example in FIG. 5, the type of an event is registered in the item of "event type". Moreover, in the example in FIG. 5, the number of occurrences of the combination of the messages is registered in the item of "number of occurrences of pattern". Furthermore, in the example in FIG. 5, the number of occurrences of an event during a predetermined time, such as 15 seconds, since the occurrence of the combination of the messages is registered in the item of "number of occurrences of event after occurrence of pattern". Moreover, in the example in FIG. 5, the probability of the event with respect to the combination of the messages is registered in the item of "event probability". Furthermore, in the example in FIG. 5, an indicator for determining whether to register the combination of the messages to the fifth DB 14f, which is used to detect occurrence of the event or to detect a sign of occurrence of the event as will be described later, is registered in the item of "maturity".

In the example in FIG. 5, identifiers "1, 3, 4, 7, 16" of five messages are registered in the item of "message pattern" of the file 14_d1. Furthermore, in the example in FIG. 5, an HDD failure is registered in the item of "event type" of the file 14_d1. Moreover, in the example in FIG. 5, "2" as the number of occurrences of the five messages indicated by the identifiers "1, 3, 4, 7, 16" is registered in the item of "number of occurrences of pattern" of the file 14_d1. Furthermore, in the example in FIG. 5, "2" as the number of occurrences of the HDD failure after the occurrence of the five messages indicated by the identifiers "1, 3, 4, 7, 16" is registered in the item of "number of occurrences of event after occurrence of pattern" of the file 14_d1. Moreover, in the example in FIG. 5, "1.00 (100%)" as the probability of the HDD failure event with respect to the combination of the five messages indicated by the identifiers "1, 3, 4, 7, 16" is registered in the item of "event probability" of the file 14_d1. Furthermore, in the example in FIG. 5, "2.0" as the indicator as described above for the combination of the five messages indicated by the identifiers "1, 3, 4, 7, 16" is registered in the item of "maturity" of the file 14_d1. In each of the items of "message pattern", "event type", "number of occurrences of pattern", "number of occurrences of event after occurrence of pattern", "event probability", and "maturity" of each of the files, a corresponding content is registered by the first calculating unit 15b or a second calculating unit 15c to be described later.

In the fourth DB 14e, a combination of messages and an identifier of a file in the third DB 14d, in which the combination of the messages is registered, are registered in an associated manner. FIG. 6 is a diagram illustrating an example of a data structure of the fourth DB. In the example in FIG. 6, the fourth DB 14e contains an item of "new pattern registration destination". In the example in FIG. 6, information for identifying a file in the third DB 14d in which a newly-occurred combination of messages is to be registered, for example, an identifier of a file in the third DB 14d, is registered in the item of "new pattern registration destination". In the item of "new pattern registration destination", an identifier of a file in the third DB 14d, in which a newly-occurred combination of messages is registered, is registered by the storage control unit 15a to be described later. In the example in FIG. 6, an identifier "24fa6618-2118-440a-8591-bc9c5b99ec52" of the file 14_d2 is registered in the item of "new pattern registration destination".

Furthermore, in the example in FIG. 6, the fourth DB 14e contains items of "message pattern" and "registration destination". In the example in FIG. 6, a combination of identifiers of one or more messages is registered in the item of "message pattern". Moreover, in the example in FIG. 6, a registration destination in which the combination of the messages is registered, for example, an identifier of a file in the third DB 14d or an identifier of the fifth DB, is registered in the item of "registration destination". In the example in FIG. 6, it is indicated that a registration destination of a combination of five messages indicated by identifiers "1, 3, 4, 7, 9" is the fifth DB 14f indicated by an identifier "00000000-0000-0000-0000-00000000". Furthermore, in the example in FIG. 6, it is indicated that a registration destination of the combination of the five messages indicated by the identifiers "1, 3, 4, 7, 16" is the file 14_d1 indicated by the identifier "02e631d1-94c4-4391-a9c2-07d5fc3f75f9". Moreover, in the example in FIG. 6, a registration destination of a combination of four messages indicated by identifiers "6, 8, 9, 11" is the file 14_d2 indicated by the identifier "24fa6618-2118-440a-8591-bc9c5b99ec52". In the item of "registration destination", an identifier of a file in the third DB 14d, in which the newly-occurred combination of the messages is registered, is registered by the first calculating unit 15b to be described later. Furthermore, the registration destination in the item of "registration destination" is updated by a storing unit 15d to be described later.

In the fifth DB 14f, a combination of messages to be used to detect occurrence of an event or to detect a sign of occurrence of the event is registered. FIG. 7 is a diagram illustrating an example of a data structure of the fifth DB. In the example in FIG. 7, the fifth DB 14f contains items of "message pattern", "event type", "number of occurrences of pattern", "number of occurrences of event after occurrence of pattern", and "event probability".

In the example in FIG. 7, a combination of identifiers of one or more messages is registered in the item of "message pattern". Furthermore, in the example in FIG. 7, the type of an event is registered in the item of "event type". Moreover, in the example in FIG. 7, the number of occurrences of the combination of the messages is registered in the item of "number of occurrences of pattern". Furthermore, in the example in FIG. 7, the number of occurrences of an event during a predetermined time, such as 15 seconds, since the occurrence of the combination of the messages is registered in the item of "number of occurrences of event after occurrence of pattern". Moreover, in the example in FIG. 7, the probability of the event with respect to the combination of the messages is registered in the item of "event probability".

In the example in FIG. 7, identifiers "1, 3, 4, 7, 9" of five messages are registered in the item of "message pattern". Furthermore, in the example in FIG. 7, an HDD failure is registered in the item of "event type". Moreover, in the example in FIG. 7, "165" as the number of occurrences of the five messages indicated by the identifiers "1, 3, 4, 7, 9" is registered in the item of "number of occurrences of pattern". Furthermore, in the example in FIG. 7, "137" as the number of occurrences of the HDD failure after the occurrence of the five messages indicated by the identifiers "1, 3, 4, 7, 9" is registered in the item of "number of occurrences of event after occurrence of pattern". Moreover, in the example in FIG. 7, "0.83 (83%)" as the probability of the HDD failure event with respect to the combination of the five messages indicated by the identifiers "1, 3, 4, 7, 9" is registered in the item of "event probability". In each of the items "message pattern", "event type", "number of occurrences of pattern", "number of occurrences of event after occurrence of pattern", and "event probability", a corresponding content is registered by the storing unit 15d to be described later. Furthermore, the registered content in each of the items of "number of occurrences of pattern", "number of occurrences of event after occurrence of pattern", and "event probability" is updated by the first calculating unit 15b to be described later.

The storage unit 14 is a storage device, such as a semiconductor memory device including a flash memory, or such as a hard disk or an optical disk. Incidentally, the storage unit 14 is not limited to the storage device of the type as described above, and may be a random access memory (RAM) or a read only memory (ROM).

The control unit 15 includes an internal memory for storing programs that define procedures of various processes or for storing control data, and performs various processes based on the programs and data. As illustrated in FIG. 2, the control unit 15 includes the storage control unit 15a, the first calculating unit 15b, the second calculating unit 15c, the storing unit 15d, a detecting unit 15e, and the notification control unit 15f.

When receiving a type of an event and a date and time of occurrence of the event from the cloud system 20, the storage control unit 15a registers the received type of the event and the received date and time of occurrence of the event in the items of "event type" and "occurrence date/time", respectively, in the first DB 14b in an associated manner.

Furthermore, when receiving a message from the cloud system 20, the storage control unit 15a registers the received message in the message log 14a.

Moreover, when receiving a message indicating a start of operation from the cloud system 20, the storage control unit 15a generates the first file 14_d1 to be registered in the third DB 14d. Specifically, as illustrated in the example in FIG. 5, the storage control unit 15a performs processes as described below. For example, the storage control unit 15a generates the file 14_d1, in which "02e631d1-94c4-4391-a9c2-07d5fc3f75f9" is registered in the item of "ID" and "2011/06/12 10:15:00" is registered in the item of "configuration change date/time". Incidentally, the identifier "02e631d1-94c4-4391-a9c2-07d5fc3f75f9" is the identifier of the first file 14_d1. Furthermore, "2011/06/12 10:15:00" indicates the date and time of the start of the operation of the cloud system 20 and is contained in the message indicating the start of the operation. Meanwhile, nothing is registered in the other items such as the items of "message pattern", "event type", "number of occurrences of pattern", "number of occurrences of event after occurrence of pattern", "event probability", and "maturity" of the generated file 14_d1.

Furthermore, when receiving a message indicating a change in the configuration from the cloud system 20, the storage control unit 15a generates a new file to be registered in the third DB 14d. Specifically, the storage control unit 15a performs processes as described below. For example, the storage control unit 15a generates a file, in which "24fa6618-2118-440a-8591-bc9c5b99ec52" is registered in the item of "ID" and "2011/06/12 10:15:00" is registered in the item of "configuration change date/time". Incidentally, the identifier "24fa6618-2118-440a-8591-bc9c5b99ec52" is the identifier of the new file. Furthermore, "2011/06/12 10:15:00" is the date and time of the change in the configuration of the cloud system 20 and is contained in the message indicating the change in the configuration. Meanwhile, nothing is registered in the other items such as the items of "message pattern", "event type", "number of occurrences of pattern", "number of occurrences of event after occurrence of pattern", "event probability", and "maturity" of the generated new file.

Then, the storage control unit 15a registers the generated file in the third DB 14d. Subsequently, the storage control unit 15a registers the identifier of the generated file in the item of "new pattern registration destination" of the fourth DB 14e, to thereby update the content that has been registered in "new pattern registration destination".

Furthermore, the storage control unit 15a refers to the contents registered in the third DB 14d at predetermined time intervals, and determines whether there is a file for which a period from the date and time registered in the item of "configuration change date/time" to the current date and time has exceeded a predetermined period. If there is a file for which the predetermined period has been exceeded, the storage control unit 15a deletes, from the third DB 14d, the file for which the predetermined period has been exceeded. Subsequently, the storage control unit 15a refers to the fourth DB 14e, and deletes a record, in which the identifier of the file for which the predetermined period has been exceeded is registered in the item of "registration destination".

In contrast, if there is no file for which the predetermined period has been exceeded, the storage control unit 15a determines whether nothing is registered in the item of "message pattern", that is, whether it is blank. If it is blank, the storage control unit 15a deletes the blank file from the third DB 14d. Subsequently, the storage control unit 15a refers to the fourth DB 14e and deletes a record, in which the identifier of the blank file is registered in the item of "registration destination".

The first calculating unit 15b performs processes as described below when the operation of the cloud system 20 is started or when the configuration of the cloud system 20 is changed. Specifically, the first calculating unit 15b calculates a ratio of the number of occurrences of an event in the cloud system 20 at time points corresponding to the time of occurrence a combination of messages to the number of occurrences of the combination of the messages in the cloud system 20. Incidentally, the combination of the messages is a combination of messages whose identifiers are registered in the third DB 14d.

For example, the first calculating unit 15b first acquires, from the storage unit 14, unprocessed messages among messages contained in the message log 14a. Then, the first calculating unit 15b classifies the acquired messages according to the message types by using the second DB 14c. Incidentally, various methods are known as the method to classify messages according to types. For example, it may be possible to employ a method described in ""Trouble Detection with Message Pattern Learning" Yukihiro Watanabe, Yasuhide Matsumoto, International Processing Society of Japan Journal, Dec. 10, 2009".

Then, the first calculating unit 15b generates a combination of messages based on a predetermined rule. For example, the first calculating unit 15b generates multiple combinations of messages based on a rule that the maximum number of messages to be combined is 10 or a rule that messages in a predetermined duration are combined.

Subsequently, the first calculating unit 15b specifies the latest date and time of occurrence of a message for each of the generated combinations. Incidentally, information indicating the date and time of occurrence of a message is contained in the message. The first calculating unit 15b employs the specified latest date and time of the message as the date and time of occurrence of the combination of the messages, for each of the combinations. Subsequently, if an event that occurred during a predetermined time, such as 15 seconds, since the date and time of occurrence of the combination of the messages is registered in the first DB 14b, the first calculating unit 15b acquires the event from the first DB 14b for each of the combinations.

Then, the first calculating unit 15b determines whether all of the generated combinations of the messages are selected. If all of the generated combinations of the messages are not selected, the first calculating unit 15b selects one of the non-selected combinations of the messages.

Subsequently, the first calculating unit 15b determines whether a registration destination of the selected combination of the messages is the fifth DB 14f used for detection, by using the fourth DB 14e. Specifically, the first calculating unit 15b refers to the fourth DB 14e, and if the identifier of the fifth DB 14f used for detection is registered in the item of "registration destination" corresponding to the selected combination, determines that the registration destination of the selected combination of the messages is the fifth DB 14f used for detection. Furthermore, the first calculating unit 15b refers to the fourth DB 14e, and if the identifier of a file in the third DB 14d is registered in the item of "registration destination" corresponding to the selected combination, determines that the registration destination of the selected combination of the messages is the file indicated by the identifier in the third DB 14d. Moreover, the first calculating unit 15b refers to the fourth DB 14e, and if a combination of the identifiers of the messages corresponding to the selected combination is not registered in the item of "message pattern", performs processes as described below because this combination is a new combination. Specifically, the first calculating unit 15b determines a file in the third DB 14d indicated by the identifier registered in the item of "new pattern registration destination" as the registration destination of the selected combination of the messages.

If the registration destination of the selected combination of the messages is a file in the third DB 14d, the first calculating unit 15b determines whether an event that occurred during the predetermined time since the date and time of occurrence of the selected combination of the messages has been acquired through the above processes. Specifically, the first calculating unit 15b determines whether there is an event that occurred on a date and time corresponding to the date and time of occurrence of the selected combination of the messages.

If there is an event that occurred on a date and time corresponding to the date and time of occurrence of the selected combination of the messages, the first calculating unit 15b determines whether the selected combination of the messages is new. If the combination is new, the first calculating unit 15b registers a combination of the identifiers of the messages corresponding to the selected combination and an identifier registered in the item of "new pattern registration destination" into the items of "message pattern" and "registration destination", respectively, in the fourth DB 14e in an associated manner. Furthermore, if the combination is new, the first calculating unit 15b adds a new record in the file serving as the registration destination in the third DB 14d. Then, the first calculating unit 15b registers the combination of the identifiers of the messages corresponding to the selected combination and the corresponding occurred event in the items of "message pattern" and "event type", respectively, in the new record in an associated manner.

Subsequently, the first calculating unit 15b acquires a record corresponding to the selected combination in the file serving as the registration destination in the third DB 14d, and increments a value in the item of "number of occurrences of pattern" contained in the record by one. Then, the first calculating unit 15*b* increments a value in the item of "number of occurrences of event after occurrence of pattern" contained in the record by one. Subsequently, the first calculating unit 15*b* performs processes as described below based on the values in the items of "number of occurrences of event after occurrence of pattern" and "number of occurrences of pattern", each of which has been incremented by one. Specifically, the first calculating unit 15*b* divides the value in the item of "number of occurrences of event after occurrence of pattern" by the value in the item of "number of occurrences of pattern" to calculate the event probability as the probability of the event.

In contrast, if there is no event that occurred on a date and time corresponding to the date and time of occurrence of the selected combination of the messages, the first calculating unit 15*b* determines whether the selected combination of the messages is new. If the combination is not new, the first calculating unit 15*b* acquires a record corresponding to the selected combination in the file serving as the registration destination in the third DB 14*d*, and increments a value in the item of "number of occurrences of pattern" contained in the record by one. Then, the first calculating unit 15*b* performs processes as described below based on the value in the item of "number of occurrences of event after occurrence of pattern" and the value in the item of "number of occurrences of pattern" that has been incremented by one. Specifically, the first calculating unit 15*b* divides the value in the item of "number of occurrences of event after occurrence of pattern" by the value in the item of "number of occurrences of pattern" to calculate the event probability as the probability of the event.

Furthermore, if the registration destination of the selected combination of the messages is the fifth DB 14*f* used for detection, the first calculating unit 15*b* determines whether there is an event that occurred on a date and a time corresponding to the date and time of occurrence of the selected combination of the messages.

If there is an event that occurred on a date and time corresponding to the date and time of occurrence of the selected combination of the messages, the first calculating unit 15*b* acquires a record corresponding to the selected combination in the fifth DB 14*f* serving as the registration destination, and increments a value in the item of "number of occurrences of pattern" contained in the record by one. Subsequently, the first calculating unit 15*b* increments a value in the item of "number of occurrences of event after occurrence of pattern" contained in the record by one. Then, the first calculating unit 15*b* performs processes as described below based on the values in the items of "number of occurrences of event after occurrence of pattern" and "number of occurrences of pattern", each of which has been incremented by one. Specifically, the first calculating unit 15*b* divides the value in the item of "number of occurrences of event after occurrence of pattern" by the value in the item of "number of occurrences of pattern" to calculate the event probability as the probability of the event.

Then, the first calculating unit 15*b* updates the value in the item of "number of occurrences of pattern" in the record corresponding to the selected combination in the fifth DB 14*f* serving as the registration destination with the value in the item of "number of occurrences of pattern" that has been incremented by one. Furthermore, the first calculating unit 15*b* updates the value in the item of "number of occurrences of event after occurrence of pattern" in the same record with the value in the item of "number of occurrences of event after occurrence of pattern" that has been incremented by one. Moreover, the first calculating unit 15*b* updates the value in the item of "event probability" in the same record with the value of the calculated event probability.

In contrast, if there is no event that occurred on a date and time corresponding to the date and time of occurrence of the selected combination of the messages, the first calculating unit 15*b* acquires a record corresponding to the selected combination in the fifth DB 14*f* serving as the registration destination, and increments a value in the item of "number of occurrences of pattern" contained in the record by one. Then, the first calculating unit 15*b* performs processes as described below based on the value in the item of "number of occurrences of event after occurrence of pattern" contained in the record and the value in the item of "number of occurrences of pattern" that has been incremented by one. Specifically, the first calculating unit 15*b* divides the value in the item of "number of occurrences of event after occurrence of pattern" by the value in the item of "number of occurrences of pattern" to calculate the event probability as the probability of the event. Then, the first calculating unit 15*b* updates the value in "number of occurrences of pattern" in the record corresponding to the selected combination in the fifth DB 14*f* serving as the registration destination with the value in the item of "number of occurrences of pattern" that has incremented by one. Furthermore, the first calculating unit 15*b* updates the value in the item of "event probability" in the same record with the value of the calculated event probability.

Subsequently, the first calculating unit 15*b* selects a non-selected combination of messages again, and performs the above processes on the selected combination of the messages. The first calculating unit 15*b* repeats the above processes until processes on all of the combinations are completed.

The second calculating unit 15*c* performs processes as described below when the first calculating unit 15*b* determines that the registration destination of the selected combination of the messages is a file in the third DB 14*d*. Specifically, the second calculating unit 15*c* calculates maturity that is an indicator to determine whether the selected combination of the messages is used to detect occurrence of an event or to detect a sign of occurrence of the event, based on the event probability calculated by the first calculating unit 15*b* and the number of occurrences of the event.

For example, when the first calculating unit 15*b* determines that there is an event that occurred on a date and time corresponding to the date and time of occurrence of the selected combination of the messages, the second calculating unit 15*c* performs processes as described below. Specifically, the second calculating unit 15*c* calculates, as the maturity, a product of the event probability calculated by the first calculating unit 15*b* and the value in the item of "number of occurrences of pattern" that has been incremented by one by the first calculating unit 15*b*.

Furthermore, when the first calculating unit 15*b* determines that there is no event that occurred on a date and time corresponding to the date and time of occurrence of the selected combination of the messages, the second calculating unit 15*c* performs processes as described below. Specifically, the second calculating unit 15*c* calculates, as the maturity, a product of the event probability calculated by the first calculating unit 15*b* and the value in the item of "number of occurrences of pattern" contained in the record acquired by the first calculating unit 15*b*.

Then, the second calculating unit 15*c* updates the value in the item of "number of occurrences of pattern" in the record corresponding to the selected combination in the file serving as the registration destination in the third DB 14*d* with the value in the item of "number of occurrences of pattern" that has been incremented by one. Furthermore, the second calculating unit 15c updates the value in the item of "event probability" in the same record with the value of the calculated event probability. Moreover, the second calculating unit 15c updates the value in the item of "maturity" in the same record with the value of the calculated maturity.

When the maturity calculated by the second calculating unit 15c indicates that a condition used to detect occurrence of the event or to detect a sign of occurrence of the event is satisfied, the storing unit 15d performs processes as described below. Specifically, the storing unit 15d registers the combination of the messages, as a combination of messages used to detect occurrence of the event or to detect a sign of occurrence of the event, in the fifth DB 14f in the storage unit 14.

For example, the storing unit 15d first acquires all of records in all of files in the third DB 14d. Then, the storing unit 15d determines whether there are one or more non-selected records among all of the acquired records. If there are one or more non-selected records, the storing unit 15d selects one of the non-selected records. Subsequently, the storing unit 15d determines whether a value registered in the item of "maturity" of the selected record is greater than the threshold α. Specifically, the storing unit 15d determines whether the maturity indicates that the condition used to detect occurrence of the event or to detect a sign of occurrence of the event is satisfied. Incidentally, the storing unit 15d may employ, as the threshold α, a product of a first predetermined value or a second predetermined value and a period from the date and time registered in the item of "configuration change date/time" in the file containing the selected record to the current date and time.

If the value registered in the item of "maturity" in the selected record is greater than the threshold α, the storing unit 15d adds a record to the fifth DB 14f and copies values in the items other than the item of "maturity" of the selected record to respective items of the added record. Accordingly, when the maturity indicates that the condition used to detect occurrence of the event or to detect a sign of occurrence of the event is satisfied, a message is registered in the fifth DB 14f for detection. Then, the storing unit 15d deletes the selected record from the third DB 14d. Subsequently, the storing unit 15d specifies a record in the fourth DB 14e, in which the same content as that of the item of "message pattern" in the record copied to the fifth DB 14f is registered, and updates the item of "registration destination" in the specified record with the identifier of the fifth DB 14f.

Subsequently, the storing unit 15d selects a non-selected record again, and performs the above processes on the selected record. The storing unit 15d repeats the above processes until processes on all of the records are completed.

The detecting unit 15e detects occurrence of an event or a sign of occurrence of the event from a message transmitted by the cloud system 20, based on the combination of the messages and the event probability registered in the fifth DB 14f. As a detection method as described above, for example, the detecting unit 15e may employ a method described in ""Trouble Detection with Message Pattern Learning" Yukihiro Watanabe, Yasuhide Matsumoto, International Processing Society of Japan Journal, Dec. 10, 2009".

The notification control unit 15f causes a result detected by the detecting unit 15e to be recognized. For example, the notification control unit 15f causes the output unit 12 to display the result detected by the detecting unit 15e.

The control unit 15 is an integrated circuit, such as an application specific integrated circuit (ASIC) or a field programmable gate array (FPGA), or an electronic circuit, such as a central processing unit (CPU) or a micro processing unit (MPU).

Flow of Processes

Figure 8:
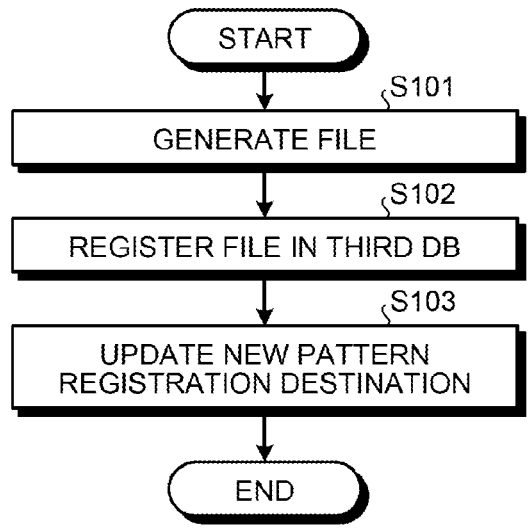
FIG. 8 is a flowchart illustrating a flow of a first registration process according to the embodiment.

Next, the flow of processes performed by the detection apparatus 10 according to the embodiment will be described. FIG. 8 is a flowchart illustrating the flow of a first registration process according to the embodiment. The detection apparatus 10 performs the first registration process every time receiving, for example, a message indicating a start of operation or a message indicating a change in the configuration from the cloud system 20.

As illustrated in FIG. 8, the storage control unit 15a generates a new file to be registered in the third DB 14d (S101). Then, the storage control unit 15a registers the generated file in the third DB 14d (S102). Subsequently, the storage control unit 15a registers an identifier of the generated file in the item of "new pattern registration destination" in the fourth DB 14e to update the content that has been registered in the item of "new pattern registration destination" (S103), and terminates the process.

Figure 9:
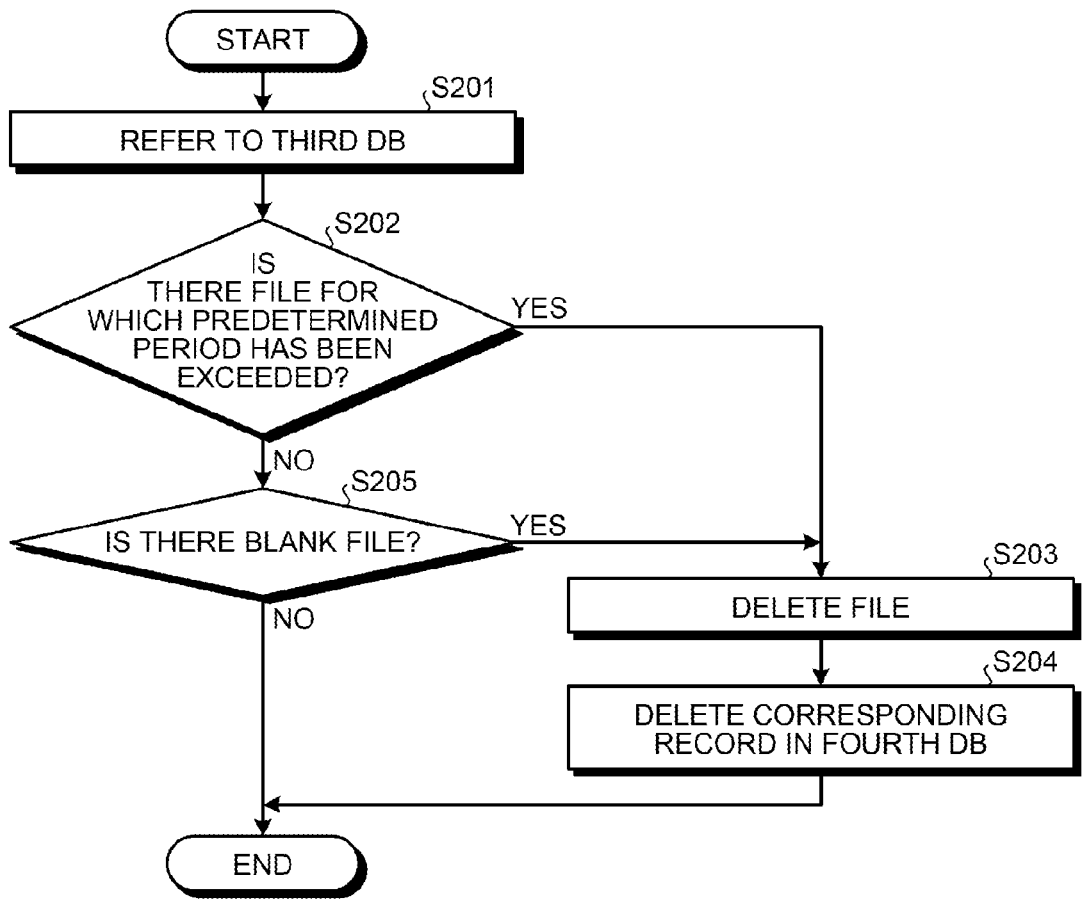
FIG. 9 is a flowchart illustrating a flow of a deletion process according to the embodiment.

FIG. 9 is a flowchart illustrating the flow of a deletion process according to the embodiment. The detection apparatus 10 performs the deletion process at predetermined time intervals for example.

As illustrated in FIG. 9, the storage control unit 15a refers to the contents registered in the third DB 14d (S201). Then, the storage control unit 15a determines whether there is a file for which a period from the date and time registered in the item of "configuration change date/time" to the current date and time has exceeded a predetermined period (S202). If there is a file for which the predetermined period has been exceeded (YES at S202), the storage control unit 15a deletes, from the third DB 14d, the file for which the predetermined period has been exceeded (S203). Subsequently, the storage control unit 15a refers to the fourth DB 14e, deletes a record, in which the identifier of the file for which the predetermined period has been exceeded is registered in the item of "registration destination" (S204), and terminates the process.

In contrast, if there is no file for which the predetermined period has been exceeded (NO at S202), the storage control unit 15a determines whether nothing is registered in the item of "message pattern", that is, whether it is blank (S205). If it is blank (YES at S205), the process proceeds to S203. If it is not blank (NO at S205), the process is terminated.

Figure 10:
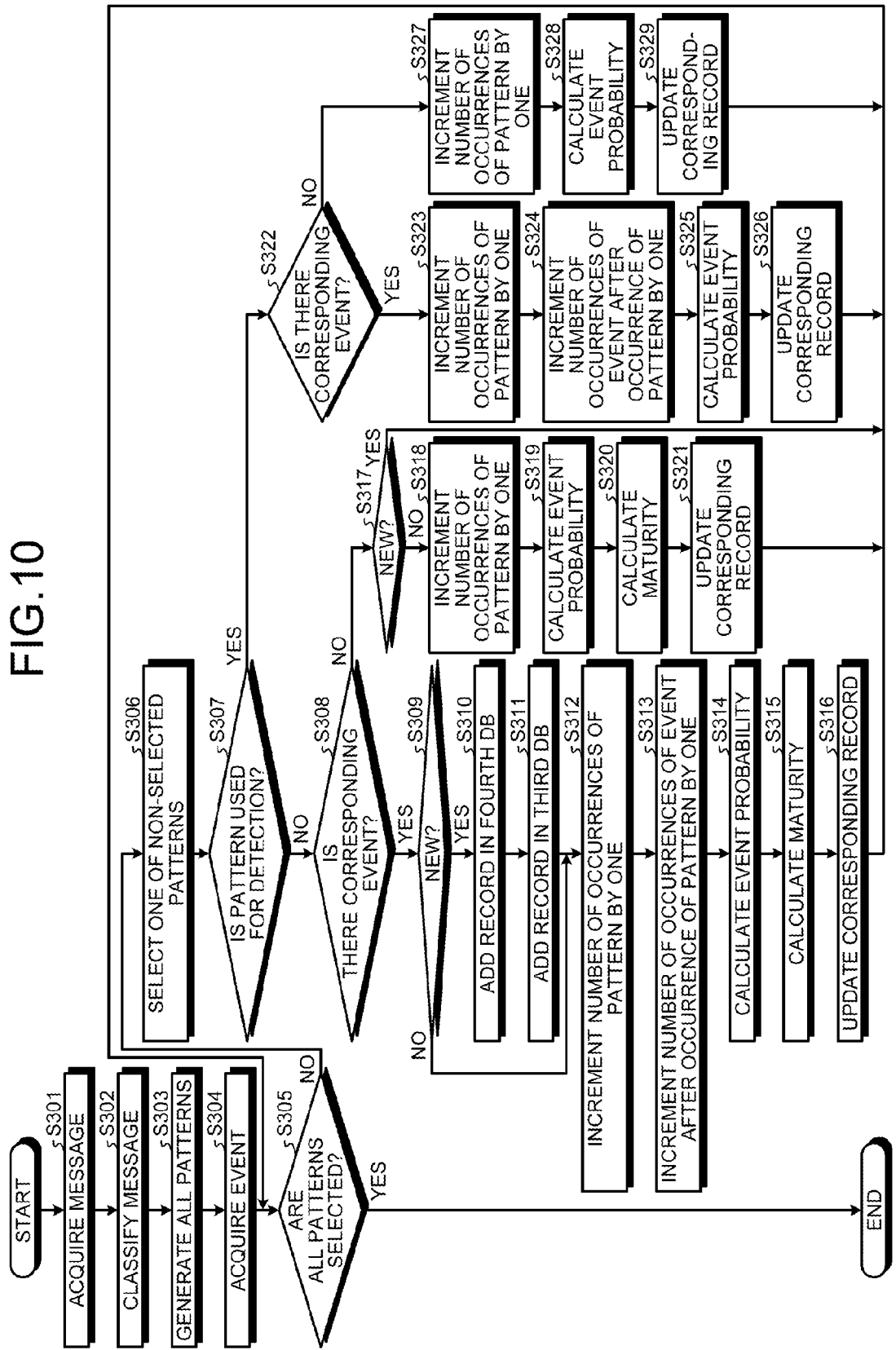
FIG. 10 is a flowchart illustrating a flow of a second registration process according to the embodiment.

FIG. 10 is a flowchart illustrating the flow of a second registration process according to the embodiment. The detection apparatus 10 performs the second registration process at predetermined time intervals for example.

As illustrated in FIG. 10, the first calculating unit 15b acquires, from the storage unit 14, unprocessed messages among messages contained in the message log 14a (S301). Then, the first calculating unit 15b classifies the acquired messages according to message types by using the second DB 14c (S302).

Subsequently, the first calculating unit 15b generates all combinations of the messages based on a predetermined rule (S303). Then, if an event that occurred during a predetermined time since the date and time of occurrence of the combination of messages is registered in the first DB 14b, the first calculating unit 15b acquires the event from the first DB 14b for each of the combinations (S304).

Subsequently, the first calculating unit 15b determines whether all of the generated combinations of the messages are selected (S305). If all of the generated combinations of the messages are selected (YES at S305), the process is terminated. If all of the generated combinations of the messages are not selected (NO at S305), the first calculating unit 15b selects one of the non-selected combinations of the messages (S306).

Then, the first calculating unit 15b determines whether a registration destination of the selected combination of the messages is the fifth DB 14f used for detection, by using the fourth DB 14e (S307).

If the registration destination of the selected combination of the messages is a file in the third DB 14d (NO at S307), the first calculating unit 15b performs processes as described below. Specifically, the first calculating unit 15b determines whether there is an event that occurred on a date and a time corresponding to the date and time of occurrence of the selected combination of the messages (S308).

If there is an event that occurred on a date and time corresponding to the date and time of occurrence of the selected combination of the messages (YES at S308), the first calculating unit 15b determines whether the selected combination of the messages is new (S309). If the combination is not new (NO at S309), the process proceeds to S312. In contrast, if the combination is new (YES at S309), the first calculating unit 15b performs processes as described below. Specifically, the first calculating unit 15b registers a combination of the identifiers of the messages corresponding to the selected combination and an identifier registered in the item of "new pattern registration destination" into the items of "message pattern" and "registration destination", respectively, in the fourth DB 14e in an associated manner (S310). Then, the first calculating unit 15b registers the combination of the identifiers of the messages corresponding to the selected combination and the corresponding occurred event in the items of "message pattern" and "event type", respectively, in the added new record in an associated manner (S311).

Subsequently, the first calculating unit 15b acquires a record corresponding to the selected combination in the file serving as the registration destination in the third DB 14d, and increments a value in the item of "number of occurrences of pattern" contained in the record by one (S312). Then, the first calculating unit 15b increments a value in the item of "number of occurrences of event after occurrence of pattern" contained in the record by one (S313). Subsequently, the first calculating unit 15b performs processes as described below based on the values in the items of "number of occurrences of event after occurrence of pattern" and "number of occurrences of pattern", each of which has been incremented by one. Specifically, the first calculating unit 15b divides the value in the item of "number of occurrences of event after occurrence of pattern" by the value in the item of "number of occurrences of pattern" to calculate the event probability as the probability of the event (S314).

The second calculating unit 15c calculates, as the maturity, a product of the event probability calculated by the first calculating unit 15b and the value in the item of "number of occurrences of pattern" that has been incremented by one by the first calculating unit 15b (S315). Then, the second calculating unit 15c updates the record corresponding to the selected combination in the file serving as the registration destination in the third DB 14d (S316), and the process returns to S305.

In contrast, if there is no event that occurred on a date and time corresponding to the date and time of occurrence of the selected combination of the messages (NO at S308), the first calculating unit 15b determines whether the selected combination of the messages is new (S317). If the combination is new (YES at S317), the process returns to S305. In contrast, if the combination is not new (NO at S317), the first calculating unit 15b performs processes as described below. Specifically, the first calculating unit 15b acquires a record corresponding to the selected combination in the file serving as the registration destination in the third DB 14d, and increments a value in the item of "number of occurrences of pattern" contained in the record by one (S318). Then, the first calculating unit 15b performs processes as described below based on the value in the item of "number of occurrences of event after occurrence of pattern" and the value in the item of "number of occurrences of pattern" that has been incremented by one. Specifically, the first calculating unit 15b divides the value in the item of "number of occurrences of event after occurrence of pattern" by the value in the item of "number of occurrences of pattern" to calculate the event probability as the probability of the event (S319).

The second calculating unit 15c calculates, as the maturity, a product of the event probability calculated by the first calculating unit 15b and the value in the item of "number of occurrences of pattern" contained in the record acquired by the first calculating unit 15b (S320). Then, the second calculating unit 15c updates a record corresponding to the selected combination in the file serving as the registration destination in the third DB 14d (S321), and the process returns to S305.

Furthermore, if the registration destination of the selected combination of the messages is the fifth DB 14f used for detection (YES at S307), the first calculating unit 15b determines whether there is an event that occurred on a date and time corresponding to the date and time of occurrence of the selected combination of the messages (S322).

If there is an event that occurred on a date and time corresponding to the date and time of occurrence of the selected combination of the messages (YES at S322), the first calculating unit 15b performs processes as described below. Specifically, the first calculating unit 15b acquires a record corresponding to the selected combination in the fifth DB 14f serving as the registration destination, and increments a value in the item of "number of occurrences of pattern" contained in the record by one (S323). Subsequently, the first calculating unit 15b increments a value in the item of "number of occurrences of event after occurrence of pattern" contained in the record by one (S324). Then, the first calculating unit 15b performs processes as described below based on the values in the items of "number of occurrences of event after occurrence of pattern" and "number of occurrences of pattern", each of which has been incremented by one. Specifically, the first calculating unit 15b divides the value in the item of "number of occurrences of event after occurrence of pattern" by the value in the item of "number of occurrences of pattern" to calculate the event probability as the probability of the event (S325). Then, the first calculating unit 15b updates a record corresponding to the selected combination in the fifth DB 14f serving as the registration destination (S326), and the process returns to S305.

In contrast, if there is no event that occurred on a date and time corresponding to the date and time of occurrence of the selected combination of the messages (NO at 5322), the first calculating unit 15b performs processes as described below. Specifically, the first calculating unit 15b acquires a record corresponding to the selected combination in the fifth DB 14f serving as the registration destination, and increments a value in the item of "number of occurrences of pattern" contained in the record by one (S327). Then, the first calculating unit 15b performs processes as described below based on the value in the item of "number of occurrences of event after occurrence of pattern" contained in the record and the value in the item of "number of occurrences of pattern" that has been incremented by one. Specifically, the first calculating unit 15b divides the value in the item of "number of occurrences of event after occurrence of pattern" by the value in the item of "number of occurrences of pattern" to calculate the event probability as the probability of the event (S328). Then, the first calculating unit 15b updates a record corresponding to the selected combination in the fifth DB 14f serving as the registration destination (S329), and the process returns to S305.

Figure 11:
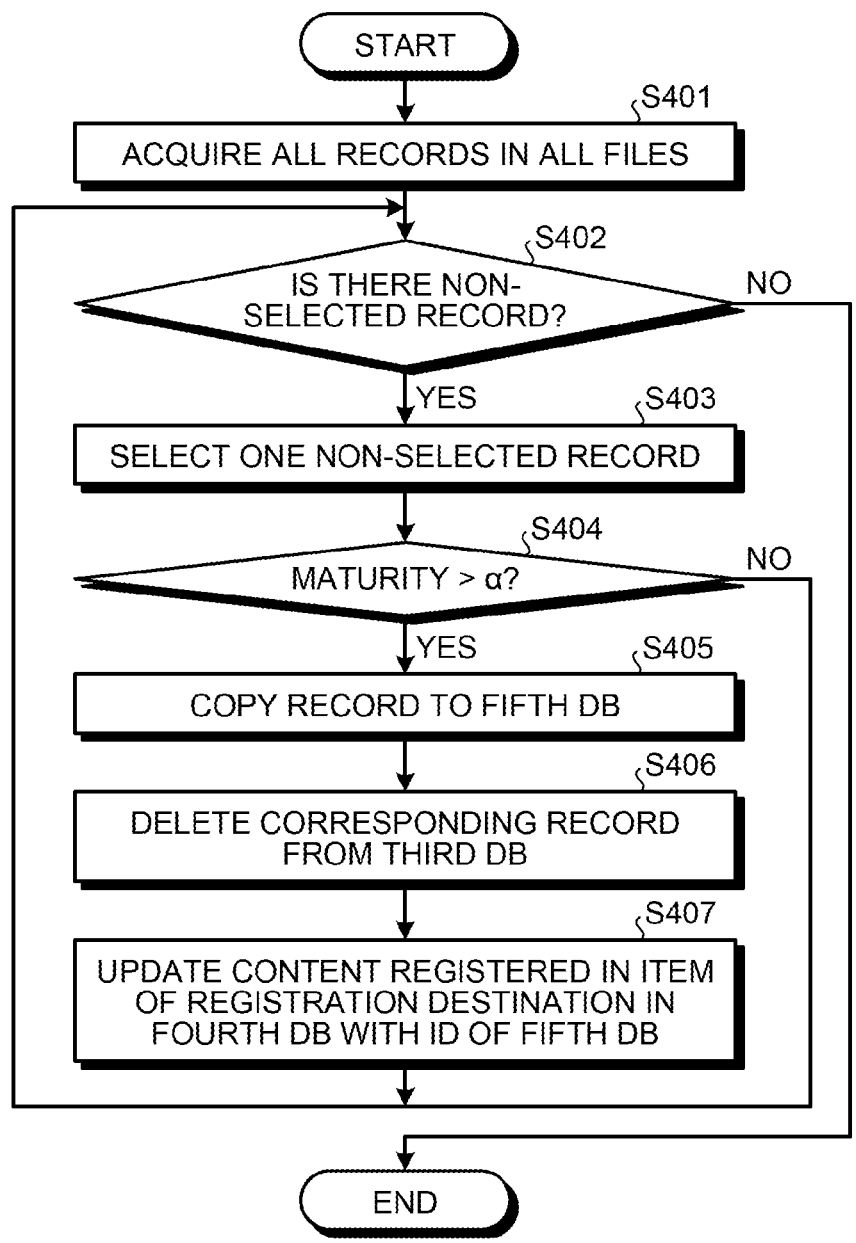
FIG. 11 is a flowchart illustrating a flow of a storage process according to the embodiment.

FIG. 11 is a flowchart illustrating the flow of a storage process according to the embodiment. The detection apparatus 10 performs the storage process at predetermined time intervals for example.

The storing unit 15d acquires all of records in all of files in the third DB 14d (S401). Then, the storing unit 15d determines whether there are one or more non-selected records among all of the acquired records (S402). If there is no non-selected record (NO at S402), the process is terminated. In contrast, if there are one or more non-selected records (YES at S402), the storing unit 15d selects one of the non-selected records (S403). Subsequently, the storing unit 15d determines whether a value registered in the item of "maturity" of the selected record is greater than the threshold a (S404).

If the value registered in the item of "maturity" in the selected record is equal to or smaller than the threshold a (NO at S404), the process returns to S402. In contrast, if the value is greater than the threshold a (YES at S404), the storing unit 15d adds a record to the fifth DB 14f and copies values in the items other than the item of "maturity" of the selected record to respective items of the added record (S405). Then, the storing unit 15d deletes the selected record from the third DB 14d (S406). Subsequently, the storing unit 15d specifies a record in the fourth DB 14e, in which the same content as that of the item of "message pattern" in the record copied to the fifth DB 14f is registered, and performs processes as described below. Specifically, the storing unit 15d updates the item of "registration destination" in the specified record with the identifier of the fifth DB 14f (S407), and the process returns to S402.

As described above, the detection apparatus 10 according to the embodiment performs processes as described below when the operation of the cloud system 20 is started or when the configuration of the cloud system 20 is changed. Specifically, the detection apparatus 10 calculates the event probability that is a ratio of the number of occurrences of an event in the cloud system 20 at time points corresponding to the time of occurrence of a combination of messages to the number of occurrences of the combination of the messages in the cloud system 20. Furthermore, the detection apparatus 10 calculates maturity that is an indicator to determine whether the selected combination of the messages is used to detect occurrence of the event or to detect a sign of occurrence of the event, based on the calculated event probability and the number of occurrences of the event. Then, if the calculated maturity is greater than the threshold $\alpha$, that is, if the maturity indicates that a condition used to detect occurrence of the event or to detect a sign of occurrence of the event is satisfied, the detection apparatus 10 performs processes as described below. Specifically, the detection apparatus 10 registers the combination of messages, as a combination of messages used to detect occurrence of the event or to detect a sign of occurrence of the event, in the fifth DB 14f in the storage unit 14. As described above, the detection apparatus 10 uses, as a combination of messages for detection, a combination of messages for which the maturity is greater than the threshold a among combinations of messages. Therefore, the detection apparatus 10 does not use, as a message for detection, a message that occurs immediately after a start of operation of the system or immediately after a change in the configuration of the system. Therefore, because the detection apparatus 10 does not use a message with which the accuracy of detection becomes uncertain even immediately after the start of the operation of the system or immediately after the change in the configuration of the system, it becomes possible to detect an event with high accuracy.

Furthermore, the detection apparatus 10 may employ, as the threshold $\alpha$, a product of the second predetermined value and a period from the date and time registered in the item of "configuration change date/time" in the file containing the selected record to the current date and time. Therefore, in the detection apparatus 10, it becomes possible to set a higher threshold a for a combination of messages for which a longer period has elapsed since a change in the configuration among combinations of messages registered in a file generated upon the change in the configuration. Consequently, in the detection apparatus 10, a combination of messages with an older date and time of occurrence becomes more difficult to be registered in the fifth DB 14f used for detection. Therefore, in the detection apparatus 10, it becomes possible to prevent a combination of messages whose maturity is not increased with time in the cloud system 20 from being registered in the fifth DB 14f used for detection.

Figure 12:
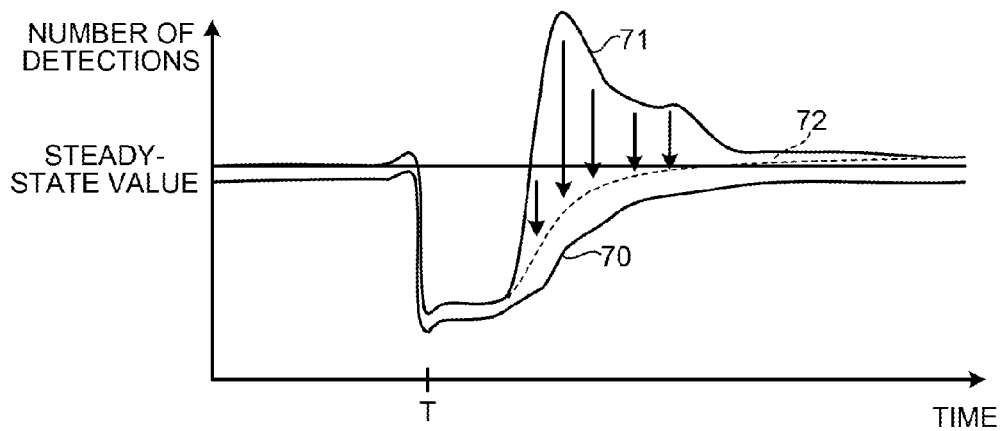
FIG. 12 is a diagram for explaining an advantageous effect obtained by the detection apparatus according to the embodiment.

FIG. 12 is a diagram for explaining advantageous effects obtained by the detection apparatus 10 according to the embodiment. In the example in FIG. 12, the horizontal axis represents time. Furthermore, in the example in FIG. 12, the vertical axis represents the number of detections. The example in FIG. 12 illustrates the number of false detections by each of a conventional detection apparatus and the detection apparatus 10 according to the embodiment in a cloud system similar to the system of the embodiment. In the example in FIG. 12, the configuration of the cloud system is changed at a time T. In the example in FIG. 12, the number of correct detections by each of the conventional detection apparatus and the detection apparatus 10 according to the embodiment is almost the same between both of the devices, and is represented by a line 70 illustrating the number of correct detections. In contrast, as for the number of false detections in the example in FIG. 12, the number of false detections by the conventional detection apparatus is represented by a line 71 and the number of false detections by the detection apparatus 10 according to the embodiment is represented by a line 72. As illustrated in the example in FIG. 12, in the detection apparatus 10 according to the embodiment, the number of false detections after the change in the configuration is reduced as compared to the conventional detection apparatus.

While the embodiment of the apparatus of the disclosed technology has been explained above, the present invention may be embodied in various forms other than the embodiment as described above. Therefore, the other embodiments of the present invention will be explained below.

Of the processes described in the embodiments, all or part of a process described as being performed automatically may also be performed manually. Alternatively, all or part of a process described as being performed manually may also be performed automatically by known methods.

Furthermore, the processes at Steps in the processes explained in the embodiment may be distributed or integrated in an arbitrary manner depending on various loads or use conditions. Moreover, part of Steps may be omitted.

The order of the processes at Steps in the processes explained in the embodiment may be changed depending on various loads or use conditions. For example, the order of the process at S202 and the process at S203 in FIG. 9 may be changed.

The components illustrated in the drawings are functionally conceptual and do not necessarily have to be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions. For example, the first calculating unit 15b and the second calculating unit 15c illustrated in FIG. 2 may be integrated into a single calculating unit.

Detection Program

Figure 13:
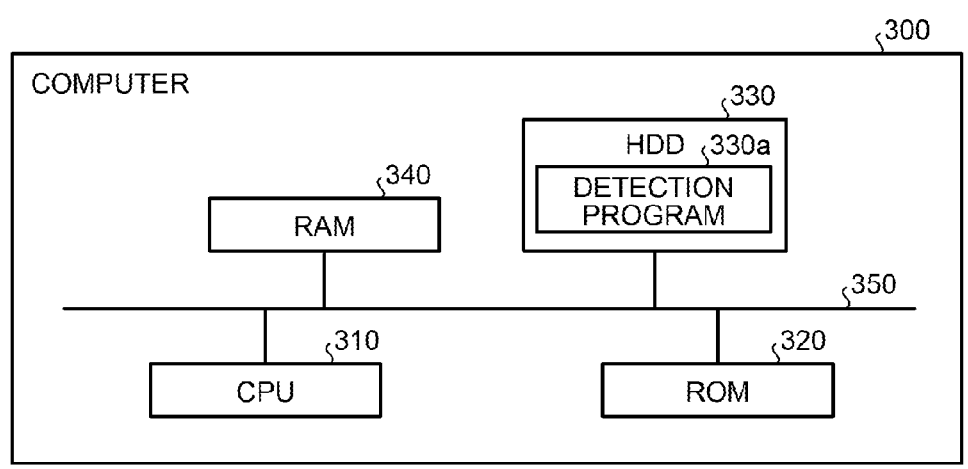
FIG. 13 is a diagram illustrating a computer that executes a detection program.

The various processes performed by the detection apparatus 10 explained in the embodiment may be realized by causing a computer system, such as a personal computer or a workstation, to execute a program provided in advance. Therefore, an example of a computer that executes a detection program with the same functions as those of the detection apparatus 10 explained in the above embodiment will be explained below with reference to FIG. 13. FIG. 13 is a diagram illustrating the computer that executes the detection program.

As illustrated in FIG. 13, a computer 300 includes a central processing unit (CPU) 310, a read only memory (ROM) 320, a hard disk drive (HDD) 330, and a random access memory (RAM) 340. The devices denoted by 310 to 340 are connected to one another via a bus 350.

The ROM 320 stores therein a basic program, such as an operating system (OS). The HDD 330 prestores therein a detection program 330a that implements the same functions as those of the storage control unit 15a, the first calculating unit 15b, the second calculating unit 15c, the storing unit 15d, the detecting unit 15e, and the notification control unit 15f as described above. Incidentally, the detection program 330a may be distributed appropriately. Furthermore, the HDD 330 stores therein a message log and first to fifth DBs. The message log and the first to the fifth DBs respectively correspond to the message log 14a and the first to the fifth DBs 14b to 14f as described above.

The CPU 310 loads and executes the detection program 330a from the HDD 330.

Then, the CPU 310 loads and stores the message log and the first to the fifth DBs into the RAM 340. Furthermore, the CPU 310 executes the detection program 330a by using the message log and the first to the fifth DBs stored in the RAM 340. Incidentally, all pieces of data stored in the RAM 340 need not always be stored in the RAM 340. It is sufficient to store data used for a process in the RAM 340.

The detection program 330a as described above need not be stored in the HDD 330 from the beginning.

For example, the program may be stored in a "portable physical medium", such as a flexible disk (FD), a compact disc (CD)-ROM, a magnetooptical (MO) disk, a digital versatile disk (DVD), or an IC card, to be inserted into the computer 300. Then, the computer 300 may load and execute the program from the medium.

Furthermore, the program may be stored in "another computer (or a server)" connected to the computer 300 via a public line, the Internet, a local area network(LAN), a wide area network (WAN), or the like. Then, the computer 300 may load and execute the program from the computer as described above.

It becomes possible to prevent reduction in the accuracy for detecting occurrence of an event.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A detection apparatus comprising:
 a first calculating unit that calculates, when operation of a system is started or when a configuration of the system is changed and when a combination of messages occurs in the system after the start of the operation of the system or the change in the configuration of the system, a ratio of number of occurrences of an event in the system at time points corresponding to a time of occurrence of the combination to number of occurrences of the combination;
 a second calculating unit that calculates an indicator to determine whether the combination of the messages is used to detect occurrence of the event or to detect a sign of occurrence of the event, based on the ratio calculated by the first calculating unit and the number of occurrences of the event; and
 a storing unit that stores, when the indicator calculated by the second calculating unit indicates that a condition used to detect occurrence of the event or to detect the sign of occurrence of the event is satisfied, the combination of the messages in a storage unit as a combination of messages used to detect occurrence of the event or to detect the sign of occurrence of the event.

2. The detection apparatus according to claim 1, wherein the second calculating unit calculates, as the indicator, a product of the ratio calculated by the first calculating unit and the number of occurrences of the event.

3. The detection apparatus according to claim 1, further comprising a storage control unit that, when a predetermined time has elapsed since the start of the operation of the system or the change in the configuration of the system, causes the storing unit not to store, as the combination of the messages used to detect occurrence of the event or to detect the sign of occurrence of the event, a combination of messages that has not been stored in the storage unit by the storing unit among combinations of messages that occur in the system, in the storage unit.

4. The detection apparatus according to claim 1, wherein when the indicator calculated by the second calculating unit exceeds a product of one of a first predetermined value and a second predetermined value and a value corresponding to a time elapsed since the start of the operation of the system or the change in the configuration of the system, the storing unit stores the combination of the messages in the storage unit as the combination of the messages used to detect occurrence of the event or to detect the sign of occurrence of the event.

5. The detection apparatus according to claim 1, further comprising a detecting unit that detects occurrence of an event or a sign of occurrence of the event based on a combination of messages that has been stored, as the combination of the messages used to detect occurrence of the event or to detect the sign of occurrence of the event, in the storage unit by the storing unit, and based on a ratio of number of occurrences of the event in the system at time points corresponding to a time of occurrence of the combination.

6. A computer-readable, non-transitory, recording medium having stored therein a detection program for causing a computer to execute a process, the process comprising:
 firstly calculating, when operation of a system is started or when a configuration of the system is changed and when a combination of messages occurs in the system after the start of the operation of the system or the change in the configuration of the system, a ratio of number of occurrences of an event in the system at time points corresponding to a time of occurrence of the combination to number of occurrences of the combination;

secondly calculating an indicator to determine whether the combination of the messages is used to detect occurrence of the event or to detect a sign of occurrence of the event, based on the calculated ratio and the number of occurrences of the event; and storing, when the calculated indicator indicates that a condition used to detect occurrence of the event or to detect the sign of occurrence of the event is satisfied, the combination of the messages in a storage unit as a combination of messages used to detect occurrence of the event or to detect the sign of occurrence of the event.

7. A detection method implemented by a computer, the detection method comprising:

firstly calculating, when operation of a system is started or when a configuration of the system is changed and when a combination of messages occurs in the system after the start of the operation of the system or the change in the configuration of the system, a ratio of number of occurrences of an event in the system at time points corresponding to a time of occurrence of the combination to number of occurrences of the combination;

secondly calculating an indicator to determine whether the combination of the messages is used to detect occurrence of the event or to detect a sign of occurrence of the event, based on the calculated ratio and the number of occurrences of the event; and storing, when the calculated indicator indicates that a condition used to detect occurrence of the event or to detect the sign of occurrence of the event is satisfied, the combination of the messages in a storage unit as a combination of messages used to detect occurrence of the event or to detect the sign of occurrence of the event.

* * * * *